US008116548B2

(12) United States Patent
Zheng et al.

(10) Patent No.: US 8,116,548 B2
(45) Date of Patent: Feb. 14, 2012

(54) METHOD AND SYSTEM FOR DETECTING 3D ANATOMICAL STRUCTURES USING CONSTRAINED MARGINAL SPACE LEARNING

(75) Inventors: Yefeng Zheng, Dayton, NJ (US); Bogdan Georgescu, Plainsboro, NJ (US); Haibin Ling, Plainsboro, NJ (US); Michael Scheuering, Nürnberg (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 417 days.

(21) Appl. No.: 12/471,761

(22) Filed: May 26, 2009

(65) Prior Publication Data

US 2009/0304251 A1 Dec. 10, 2009

Related U.S. Application Data

(60) Provisional application No. 61/058,661, filed on Jun. 4, 2008.

(51) Int. Cl.
*G06K 9/00* (2006.01)
(52) U.S. Cl. ........................................ 382/131; 382/154
(58) Field of Classification Search .......... 382/128–144, 382/154, 159, 160, 285; 378/4, 21; 600/425; 345/419–427
See application file for complete search history.

(56) References Cited

U.S. PATENT DOCUMENTS

| 7,558,413 | B2 * | 7/2009 | Tu et al. ......................... 382/128 |
| 8,009,900 | B2 * | 8/2011 | Barbu et al. .................... 382/154 |
| 2008/0085050 | A1 | 4/2008 | Barbu et al. |
| 2008/0101676 | A1 | 5/2008 | Zheng et al. |
| 2008/0211812 | A1 * | 9/2008 | Barbu et al. .................... 345/424 |
| 2008/0292153 | A1 * | 11/2008 | Binnig et al. .................. 382/128 |
| 2009/0080745 | A1 | 3/2009 | Zheng et al. |
| 2010/0239148 | A1 * | 9/2010 | Zheng et al. .................... 382/131 |

* cited by examiner

*Primary Examiner* — Hoa Pham (57) ABSTRACT

A method and apparatus for detecting 3D anatomical objects in medical images using constrained marginal space learning (MSL) is disclosed. A constrained search range is determined for an input medical image volume based on training data. A first trained classifier is used to detect position candidates in the constrained search range. Position-orientation hypotheses are generated from the position candidates using orientation examples in the training data. A second trained classifier is used to detect position-orientation candidates from the position-orientation hypotheses. Similarity transformation hypotheses are generated from the position-orientation candidates based on scale examples in the training data. A third trained classifier is used to detect similarity transformation candidates from the similarity transformation hypotheses, and the similarity transformation candidates define the position, translation, and scale of the 3D anatomic object in the medical image volume.

27 Claims, 6 Drawing Sheets

METHOD AND SYSTEM FOR DETECTING 3D ANATOMICAL STRUCTURES USING CONSTRAINED MARGINAL SPACE LEARNING

This application claims the benefit of U.S. Provisional Application No. 61/058,661, filed Jun. 4, 2008, the disclosure of which is herein incorporated by reference.

BACKGROUND OF THE INVENTION

The present invention relates 3D object detection in images, and more particularly, to automated detection of 3D anatomical structures in medical images using marginal space learning.

Efficiently localizing anatomical structures (e.g., heart, liver, kidney, etc.) in medical images is often a prerequisite for further diagnostic image processing procedures, such as segmentation, measuring, and classification. Detecting and segmenting human anatomic structures in 3D medical image volumes (e.g., CT, MRI, etc.) is a challenging problem, which is typically more difficult than detecting anatomic structures in 2D images.

Previously, marginal space learning (MSL) has been proposed for efficient and automatic 3D object localization based on learning of discriminative classifiers. The full parameter space for 3D object localization has nine dimensions: three for position ($P_x$, $P_y$, and $P_z$), three for orientation (represented with Euler angles, $\psi$, $\phi$, and $\theta$), and three for anisotropic scaling ($S_x$, $S_y$, and $S_z$). In MSL, in order to efficiently localize an object, parameter estimation is performed in a series of marginal spaces with increasing dimensionality. In particular, the object detection is split into three steps: object position estimation, position-orientation estimation, and similarity transformation estimation. Each step results in a relatively small number of candidates, which are used in the following step. Accordingly, instead of uniformly searching the original nine-dimensional parameter space, low-dimensional marginal spaces are uniformly searched in MSL. MSL has been successfully applied to many 3D anatomical structure detection problems in medical imaging, such as ileocecal valves, polyps, and livers in abdominal CT, brain tissues and heart chambers in ultrasound images, and heart chambers in MRI.

MSL can reduce the number of testing hypotheses by approximately six orders of magnitude as compared with uniformly searching the nine-dimensional parameter space. However, in many cases MSL tests more testing hypotheses than necessary for accurate object detection. Accordingly, it is desirable to further increase the efficiency of anatomical object detection using MSL.

BRIEF SUMMARY OF THE INVENTION

The present invention provides efficient detection of 3D anatomical structures in medical images using constrained marginal space learning (MSL). Embodiments of the present invention can be used to constrain the search space for the position, orientation, and scale when detecting a 3D anatomical object using MSL. This reduces the number of hypotheses to be tested in each stage of the MSL object detection, which speeds up the MSL object detection.

In one embodiment of the present invention, a constrained search range is determined for an input medical image volume based on training volumes. A first trained classifier is used to detect position candidates in the constrained search range. Position-orientation hypotheses are generated from the position candidates using orientation examples in the training volumes. A second trained classifier is used to detect position-orientation candidates from the position-orientation hypotheses. Similarity transformation hypotheses are generated from the position-orientation candidates based on scale examples in the training volumes. A third trained classifier is used to detect similarity transformation candidates from the similarity transformation hypotheses, and the 3D anatomic object is detected in the medical image volume based on at least one of the similarity transformation candidates.

These and other advantages of the invention will be apparent to those of ordinary skill in the art by reference to the following detailed description and the accompanying drawings.

DETAILED DESCRIPTION

The present invention is directed to a method for 3D anatomical object detection in medical images, such as computed tomography (CT), magnetic resonance imaging (MRI), ultrasound, etc. Embodiments of the present invention are described herein to give a visual understanding of the anatomical object detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

According to an embodiment of the present invention, an anatomical structure is detected in 3D medical image using constrained marginal space learning (MSL). MSL is a technique for efficiently detecting or localizing a 3D object in an image using learned discriminative classifiers. The full parameter space for 3D object localization has nine dimensions: three for position ($P_x$, $P_y$, and $P_z$), three for orientation (represented with Euler angles, $\psi$, $\phi$, and $\theta$), and three for anisotropic scaling ($S_x$, $S_y$, and $S_z$). In order to efficiently localize an object using MSL, parameter estimation is performed in a series of marginal spaces with increasing dimensionality. In particular, the object detection is split into three steps: object position estimation, position-orientation estimation, and similarity transformation estimation. Each of these steps uses a separate trained classifier. For example, a classifier for each detection step can be trained based on trained data using a probabilistic boosting tree (PBT).

In previous applications of MSL, each of the marginal spaces is uniformly searched in order to generate testing samples for detection in that marginal space. However, depending on the application scenario, it is possible to further reduce the search range for each of the parameters. For example, the variation of the heart orientation in a CT scan is limited and the physical size of the heart is also bounded. For each parameter, the range of its value can be estimated from the set of training data used to train the discriminative classifiers used in the MSL procedure. Suppose the minimum and maximum values of the parameter $P^i$ are $P_{min}^i$, and $P_{max}^i$, respectively, in the training data. During searching, $P^i$ can be uniformly sampled with a specific search step to tightly cover the range $[P_{min}^i, P_{max}^i]$ to get a set of hypotheses. Each of the three marginal spaces (translation, orientation, and scale spaces) is uniformly sampled without considering any correlation between parameters in the same marginal space. However, in many real applications, the parameters in the same marginal space are unlikely to be independent. For example, in heart chamber detection, three Euler angles can be combined to represent an orientation, while the orientation of a heart chamber in a CT scan in constrained (e.g., the tip of the heart cannot point toward a person's head). The three scale parameters are also not independent. A large object (e.g., the heart of an adult) is likely to have larger values than a small object (e.g., the heart of a baby) in all three scale parameters. The exhaustive uniform sampling strategy used in previous MSL applications will result in much more testing than necessary to accurately detect 3D anatomic structures. Furthermore, the speed of detecting using MSL is roughly linear with respect to the number of hypotheses. By reducing the number of hypotheses, the MSL detection can be sped up, resulting in more efficient detection of 3D anatomic structures.

According to embodiments of the present invention, the search in the various marginal spaces can be constrained by exploiting the correlation among object pose parameters. Due to the heterogeneities in the capture range of the scanning protocols, the position of an organ may vary significantly in a volume. Embodiments of the present invention provide a generic way to reduce the search range for the object position, regardless of the anatomic structure being detected. To study an organ, it is typically needed to capture the whole (or almost the whole) organ in the volume. Therefore, the center of the organ cannot be arbitrarily close to the volume boundary. Based on this observation, it is possible to safely skip those hypotheses around the volume margin when detecting the position of the anatomic object.

In order to constrain the search of the orientation and scale spaces, the joint distribution of parameters can be estimated using the training data, and only regions have large probabilities are sampled. However, it is not trivial to estimate the joint distributions reliably, since many parameters need to be tuned or traded off (e.g., parametric, non-parametric, kernel type, and kernel size). Accordingly, embodiments of the present invention utilize an example-based strategy to constrain the search to a region with large probabilities. The parameter space is first uniformly sampled (within a range) to get a large set. For each training sample, all neighboring hypotheses in the set are searched for, and inserted in a test set. Repeating this process for all training samples and removing redundant hypotheses from the test set can result in a much smaller test set than the original uniformly sampled set. Using the constrained MSL according to embodiments of the present invention can improve detection speed of 3D anatomic objects. Furthermore, in addition to speeding up detection, constraining the search to a small valid region can reduce the likelihood of detection outliers, thus improving overall accuracy of the detection results.

In previous MSL detection applications, the 3D orientation space is represented as three Euler angles, which have several limitations. There are multiple sets of parameter values that can yield the same orientation, leading to a fundamental ambiguity. During training, a hypothesis is assigned to the positive or negative set based on its distance to the ground truth. The Euclidean distance in the Euler angle space is used as the distance measure between two orientations. However, the Euclidean distance may not be a good distance measure for measuring the distance between two orientations. Due to the fundamental ambiguity, two close orientations may have a large Euclidean distance between them in the Euler angle space. Therefore, the collected positive and negative sets of training data may be confusing, which can make the learning of the classifier difficult. Another issue relating to the use of the Euler angles is that uniform sampling in the Euler angle space is not uniform in the orientation space. Further, there are many widely used conventions of Euler angles, and for a specific application, the representation with one convention may be more compact than other conventions. To reduce the search range, an Euler angle convention needs to be selected depending on the target anatomical structure and the imaging modality. For example, for the same task of heart chamber detection, the ZXZ convention is used for CT volumes, while the XYZ convention is used for ultrasound volumes. In summary, the use of Euler angles for orientation representation in previous MSL object detection applications may have the following drawbacks: 1) an Euler angle convention that represents the search range must be manually selected; 2) the Euclidean distance in the Euler angle space is not a good distance measure of orientations; 3) naïve uniform sampling of the Euler angle space is not uniform in the orientation space; and 4) each Euler angle is uniformly sampled without exploiting correlation among parameters. According to embodiments of the present invention, a quaternion based orientation distance measure is used to overcome the above described issues.

Figure 1:
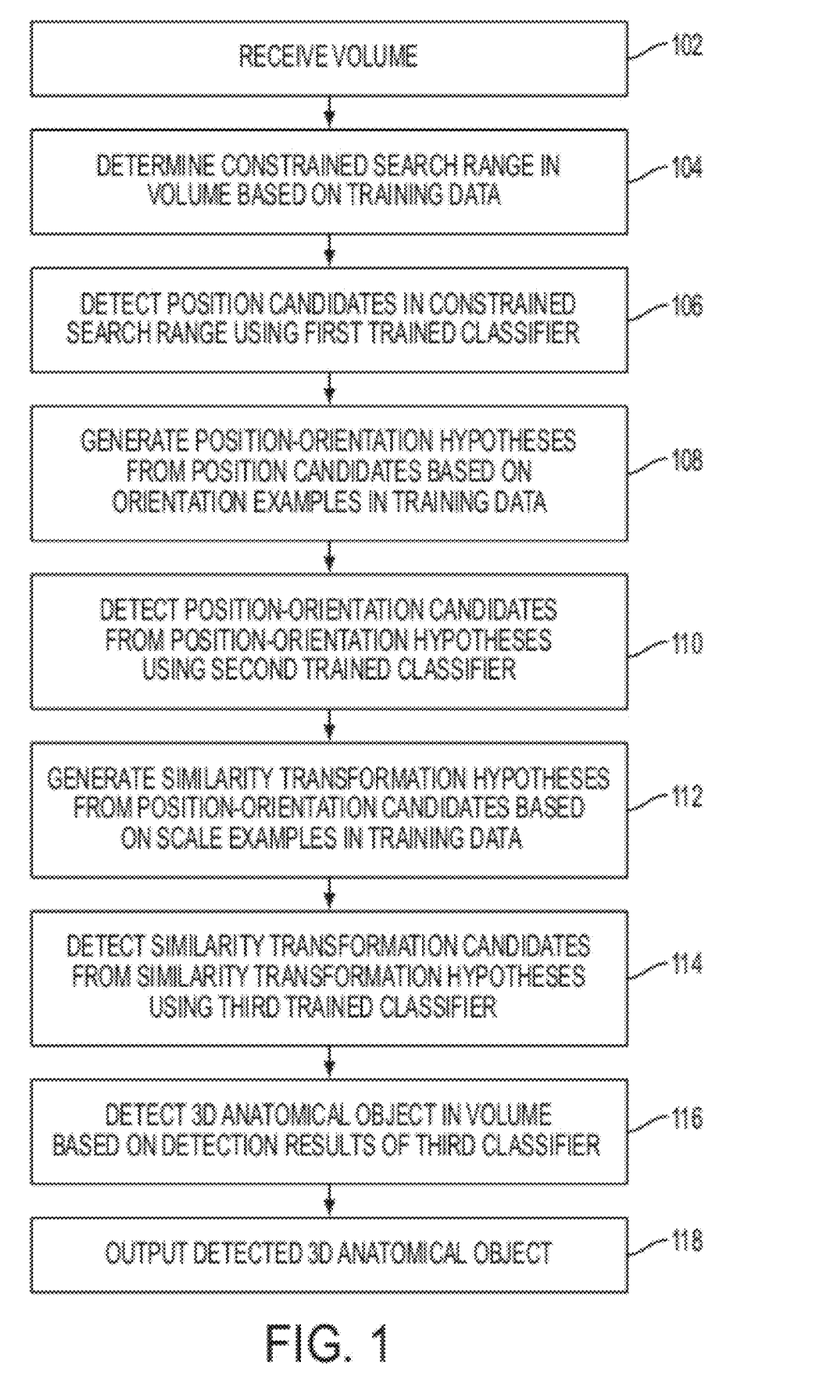
FIG. 1 illustrates a method of detecting a 3D anatomical object in a medical image volume using constrained marginal space learning (MSL) according to an embodiment of the present invention.

FIG. 1 illustrates a method of detecting a 3D anatomical object in a medical image volume using constrained marginal space learning (MSL) according to an embodiment of the present invention. The method of FIG. 1 transforms data representing the anatomical structure of a patient in order to output data representing the location of a specific anatomical object of the patient. For example, such anatomical objects can include the heart, specific chambers of the heart, brain tissue, lungs, liver, ileocecal valves, polyps, etc.

Referring to FIG. 1, at step 102, a medical image volume is received. For example, the medical image volume can be a CT volume, MRI volume, or ultrasound volume, but the present invention is not limited thereto. The medical image volume can be received directly from an image acquisition device, such as a CT scanner or an MRI scanner. It is also possible the medical image volume can be a previously scanned volume that is retrieved from a memory or storage of a computer system or a computer readable medium.

Figure 2:
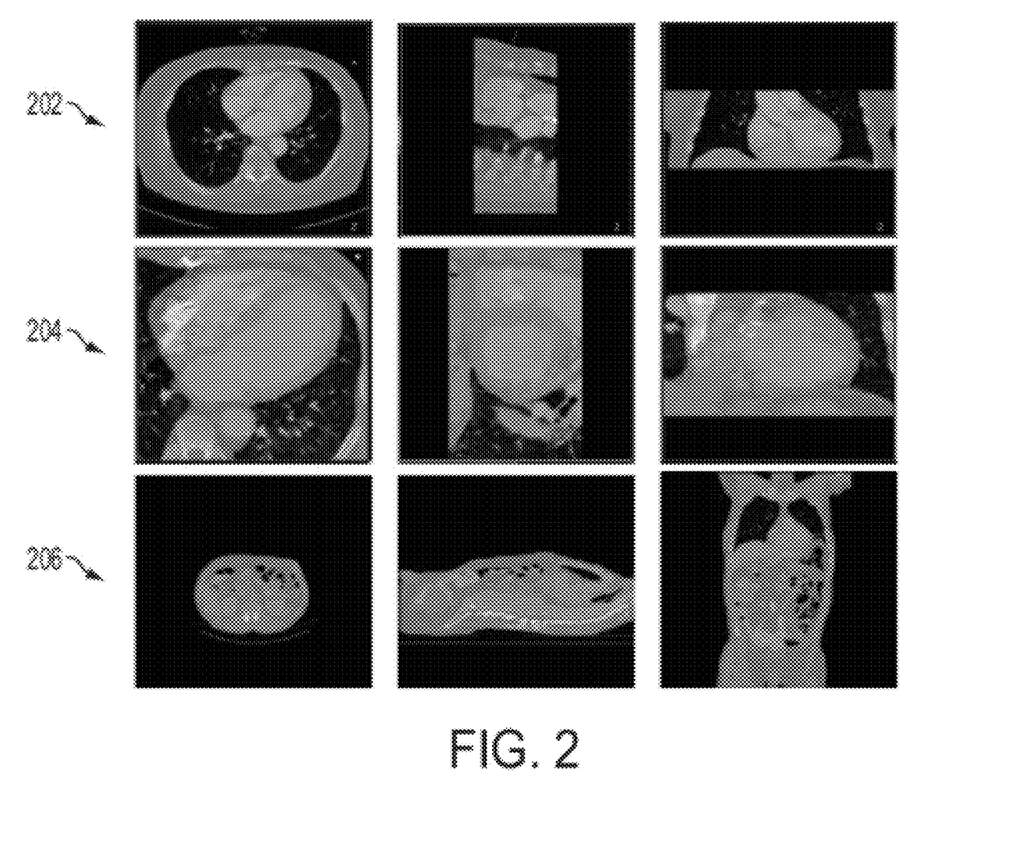
FIG. 2 illustrates exemplary 3D CT scans with different capture ranges.

Due to heterogeneities in scanning protocols, the position of an organ (anatomical object) may vary significantly between volumes. FIG. 2 illustrates exemplary 3D CT scans with different capture ranges. As illustrated in FIG. 2, each row 202, 204, and 206 represents three orthogonal views of a respective CT volume. Rows 202 and 204 are cardiac CT scans and row 206 is a full-torso CT scan. The difference of the capture range between the cardiac CT scans 202 and 204 and the full-torso CT scan 206 is large. Considerable variation can also be observed between the two cardiac scans.

Returning to FIG. 1, at step 104, a constrained search range is determined in the received medical image volume based on positions of the anatomic object in the training data. In previous learning based object detection procedures, all voxels in a volume are tested as hypotheses of the object center. This leads to a potentially large number of object center hypotheses. It is advantageous to constrain the search for the object center to a smaller region of the volume. However, the challenge is that the scheme for determining the constrained region must work for volumes with different resolution settings and capture ranges, without missing a true position during testing on an unseen volume. According to an embodiment of the present invention, the search range can be reduced based on the training data such that the reduced search range is accurate for different resolutions and capture ranges.

Figure 3A:
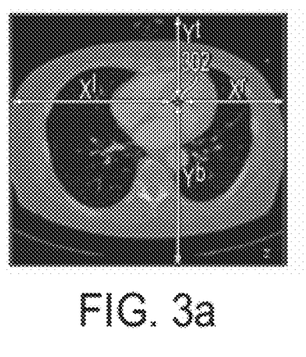
FIG. 3 illustrates determining a constrained search range based on training data.
Figure 3B:
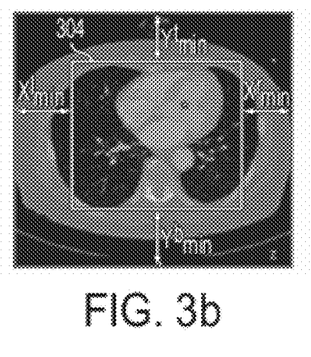
Figure 3C:
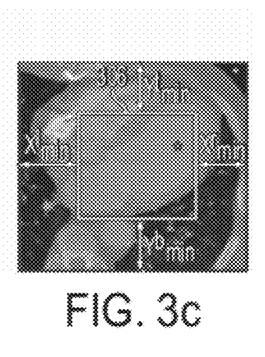
Figure 4A:
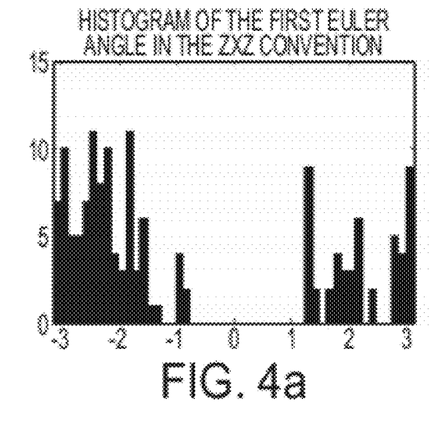
FIG. 4 illustrates exemplary histograms of Euler angles for the orientation of a left ventricle in training ultrasound volumes.
Figure 4B:
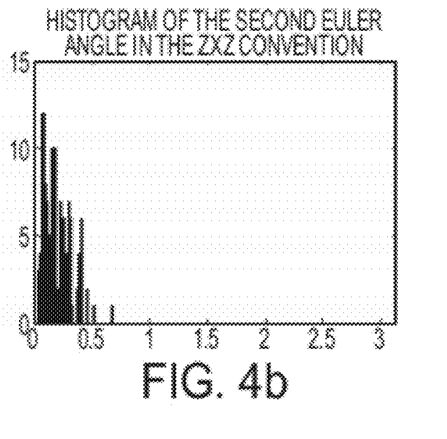
Figure 4C:
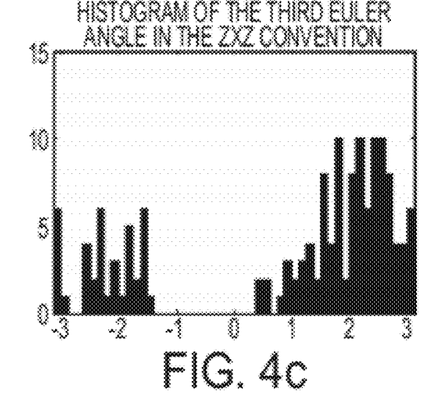
Figure 4D:
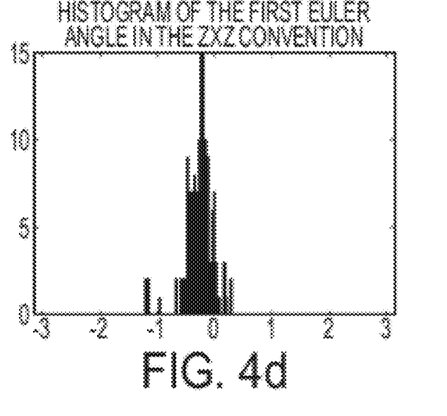
Figure 4E:
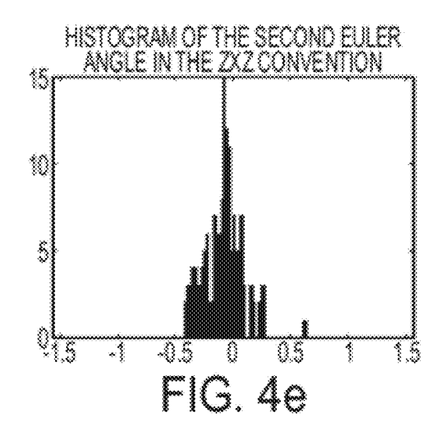
Figure 4F:
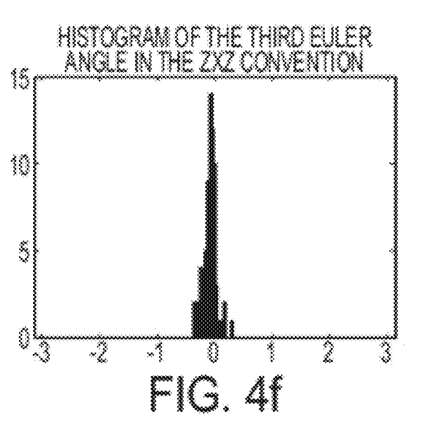

FIG. 3 illustrates determining a constrained search range based on training data. The training data includes a plurality of training volumes, in which the target anatomical object is annotated. To study an anatomical object, a volume typically must capture the whole (or almost whole) object. Therefore, the center of the object cannot be arbitrarily close to the volume boundary. For each training volume, the distance can be measured from the center of the anatomical object to the volume boundary in six directions (e.g., $X^l$ for the distance to the left volume boundary, $X^r$ for the distance to the right volume boundary, $Y^t$ for the distance to the top volume boundary, $Y^b$ for the distance to the bottom volume boundary, $Z^f$ for the distance to the front volume boundary, and $Z^b$ for the distance to the back volume boundary). As shown in image (a) of FIG. 3, the distances $X^l$, $X^r$, $Y^t$, and $Y^b$ are measured from the center 302 of the left ventricle in a slice of a training cardiac CT volume. In an advantageous implementation, all distances are measured in physical units (e.g., millimeters) since different volumes may have different resolution settings. Once the distances from the center of the object to each volume boundary are measured for each training volume, the minimum value for each distance measure (e.g., $X_{min}^l$ for the left margin, etc.) is determined from the training set. These minimum margins define a region in the input volume that can constrain the search for the center point of the anatomical object. As shown in image (b) of FIG. 3, the constrained search range 304 is defined by $X_{min}^l$, $X_{min}^r$, $Y_{min}^t$, and $Y_{min}^b$ on a CT scan with a large capture range. As shown in image (c) of FIG. 3, the constrained search range 306 is defined by $X_{min}^l$, $X_{min}^r$, $Y_{min}^t$, and $Y_{min}^b$ on a CT scan with a small capture range. It is to be understood that the constrained search ranges 304 and 306 are actually 3D regions in a CT volume which are also defined by $Z_{min}^f$ and $Z_{min}^b$, but are shown in 2D slices in images (b) and (c). As shown in images (b) and (c) of FIG. 3, the constrained search range may be more effective for a volume with a small capture range (image (c)) than a volume with a large capture range (image (b)). Although FIG. 3 shows the determination of the constrained search range for use in detection of a left ventricle, it is to be understood that the method for determining the constrained search range described herein is generic and can be used for various different application scenarios. Furthermore, if there is any application specific prior knowledge available for the object position, this prior knowledge can also be combined with the method described herein to further reduce the search range.

Returning to FIG. 1, at step 106, position candidates are detected in the constrained search range of the medical image volume using a first trained classifier. In particular, the first classifier is used to scan each voxel within the constrained search range determined in step 104 to determine a probability for each voxel that the voxel is the center point of the anatomical object. The first classifier can be trained based on the annotated training data using a probabilistic boosting tree (PBT) with steerable features. A PBT classifier is trained by recursively constructing a tree, where each of the nodes represents a strong classifier. Once the strong classifier of each node is trained, the input training data for the node is classified into two sets (positives and negatives) using the learned strong classifier. The two new sets are fed to left and right child nodes respectively to train the left and right child nodes. In this way, the PBT classifier is constructed recursively. Once a probability is determined for each of the hypotheses (voxels) in the constrained search range, a predetermined number (e.g., 100) of the hypotheses having the highest probabilities are maintained as the position candidates.

At step 108, position-orientation hypotheses are generated from the position candidates based on a constrained set of orientation examples from the training volumes.

It is well known that the 3D orientation has a freedom of three degrees and can be represented as three Euler angles. In previous MSL applications, Euler angles are used to represent the orientation of an object. One advantage of Euler angles is that they have intuitive physical meaning. For example, an orientation with Euler angles of $\psi$, $\phi$, and $\theta$ in the ZXZ convention is achieved by rotating the original coordinate system around the z axis by the amount $\psi$, followed by a rotation around the x axis by the amount $\phi$, and lastly a rotation around the z axis again by the amount $\theta$. The rotation operation is not commutable. This means the order of the rotations cannot be changed. To train a classifier that can distinguish a correct estimation of the orientation from incorrect orientations, both positive and negative training samples are needed. In previous applications, the Euclidean distance in the Euler angle space is used to measure the distance of a hypothesis $O^h(\psi^h, \phi^h, \theta^h)$ to the ground truth $O^t(\psi^t, \phi^t, \theta^t)$, as follows:

$$D_e(O^h, O^t) = \sqrt{\|\psi^h - \psi^t\|^2 + \|\phi^h - \phi^t\|^2 + \|\theta^h - \theta^t\|^2}. \quad (1)$$

If the distance is less than a threshold, it is treated as a positive sample, otherwise it is treated as a negative sample. Although the Euclidean distance is convenient, the use of the Euclidean distance to measure orientations has disadvantages. It is well known that given two orientations, one can be rotated along an axis to align it with the other. The amount of rotation is a natural definition of the distance between two orientations. There are multiple sets of parameter values that can yield the same orientation, leading to a fundamental ambiguity. This means that two close orientations may have a large Euclidean distance between them in the Euler angle space. Therefore, the collected positive and negative samples may be confusing, which makes the learning difficult. In order to estimate the orientation of an object, it is possible to uniformly sample the orientation space to generate a set of hypotheses. Each hypothesis is then tested using the trained classifier. Although uniform under the Euclidean distance, naive uniform sampling of the Euler angle space is not truly uniform in the orientation space due to the use of a wrong distance measure.

Another drawback of Euler angles is that there are 12 conventions, some of which are widely used. It is possible to calculate the range of Euler angles from the training data. During testing, each Euler angle can be uniformly sampled within that range to generate hypotheses. Different conventions may result in extremely different search ranges. For example, if the rotation is only around the y axis, the YXZ convention (where two Euler angles are almost zero) is more compact than other conventions. FIG. 4 illustrates exemplary histograms of Euler angles for the orientation of a left ventricle in training ultrasound volumes. Histograms (a), (b), and (c) are histograms of the first, second, and third Euler angles, respectively, for the left ventricle orientation using the ZXZ convention. Histograms (d), (e), and (f) are histograms of the first, second, and third Euler angles, respectively, for the left ventricle orientation using the XYZ convention. In the example of FIG. 4, the representation with the XYZ convention is more compact than the ZXZ convention. However, for the application of heart chamber detection in cardiac CT volumes, the ZXZ convention is more efficient than the XYZ convention. Accordingly, in practice, it is necessary to try different conventions for new applications to select the most compact convention.

According to an embodiment of the present invention, quaternions can be used to represent the orientation space in order to overcome the drawbacks of Euler angles. Quaternions provide a clean, conceptual framework that allows several problems involving rotation to be easily solved. A quaternion is represented as four numbers:

$$q=[w,x,y,z], \quad (2)$$

or as a scalar and a vector:

$$q=[s,v]. \quad (3)$$

In the scalar-vector representation, multiplication of two quaternions becomes:

$$q_1 q_2 = [s_1 s_2 - v_1 \cdot v_2, s_1 v_2 + s_2 v_1 + v_1 \times v_2], \quad (4)$$

where $v_1 \cdot v_2$ is the vector inner-product and $v_1 \times v_2$ is the vector cross-product. The product of two quaternions is also a quaternion.

In order to represent an orientation, unit quaternions can be used, where:

$$|q|=w^2+x^2+y^2+z^2=1. \quad (5)$$

Therefore, the degree of freedom of a unit quaternion is three, the same as the degree of freedom of Euler angles. Using the unit quaternion, the rotation matrix, R, can be expressed as:

$$R = \begin{vmatrix} 1-2y^2-2z^2 & 2xy-2wz & 2xz+2wy \\ 2xy+2wz & 1-2x^2-2z^2 & 2yz-2wx \\ 2xz-2wy & 2yz+2wx & 1-2x^2-2y^2 \end{vmatrix}. \quad (6)$$

A unit quaternion can also be represented in the scalar-vector form as:

$$q=[\cos(\theta/2), v\sin(\theta/2)], \quad (7)$$

where v is a three dimensional vector with $|v|=1$. Given a quaternion p, we left multiply it with $q=[\cos(\theta/2), v\sin(\theta/2)]$ and get a new quaternion qp. The physical meaning of this operation is that qp represents the orientation after p is rotated around axis v by the amount of rotation $\theta$. The conjugate of a quaternion is given by:

$$\bar{q}=[w,-x,-y,-z]=[\cos(-\theta/2), v\sin(-\theta/2)], \quad (8)$$

which means that $\bar{q}$ represents a rotation around axis v by the amount of rotation $-\theta$.

Based on the above equations, the amount of rotation between two orientations can be calculated. The rotation $q=q_1 \bar{q}_2$ moves $q_2$ to $q_1$. The amount of rotation between quaternions $q_1$ and $q_2$ using the scalar-vector representation in Equation (3) can be expressed as:

$$D_q(q_1, q_2) = \theta = \arccos(|s_1 s_2 - v_1 \cdot v_2|). \quad (9)$$

For comparison, the Euclidean distance in the Euler angle space $D_e$ (Equation 1) is often larger than the quaternion distance $D_q$ (Equation 9). However, for some cases, $D_e(O_1, O_2)=D_q(O_1, O_2)$. Suppose that the ZXZ convention is used and the only rotation is around the z axis in a range less than 180 degrees. In this case, the last two Euler angles are zero. The Euclidean distance in the Euler angle space measures the rotation around the z axis, and therefore is the same as the quaternion distance defined by Equation (9).

Using the quaternion distance definition of Equation (9), it is possible to uniformly sample the whole orientation space. The problem is formulated as, given N sample orientations, distribute the sample orientations as uniformly as possible in the orientation space. A covering radius $\alpha$ can be defined as the maximum rotation needed to align an arbitrary orientation with one of the sample orientations. For uniform sampling, an optimization procedure can be used to define an optimal configuration of the N sample orientations that gives the smallest $\alpha$.

For many applications, the orientation of an anatomical object is well constrained in a small region, and it is not necessary to test the whole orientation space. For example, in an exemplary cardiac CT dataset, the ranges of Euler angles for the left ventricle using the ZXZ convention are [−0.9, 39.1] degrees for $\psi$, [−60.0, 88.7] degrees for $\phi$, and [−68.8, −21.9] degrees for $\theta$. Each Euler angle can be sampled uniformly within such regions to generate testing hypotheses. However, the three Euler angles are not independent and it is advantageous to combine the three Euler angles to define an orientation. Accordingly, uniformly sampling each Euler angle independently will generate far more hypotheses than necessary.

Figure 5:
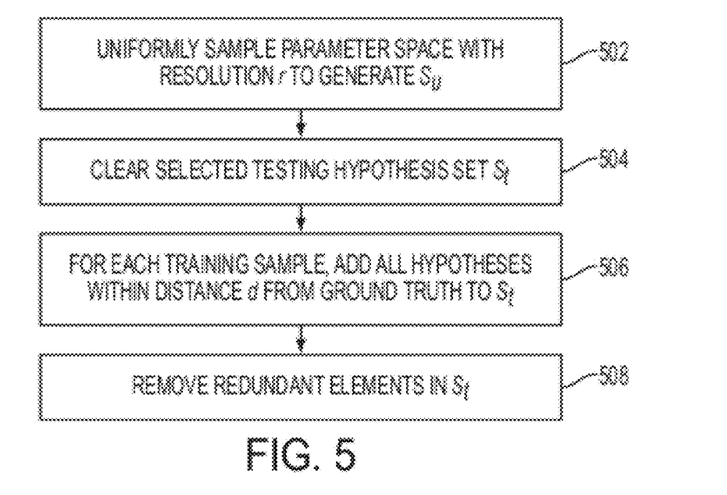
FIG. 5 illustrates an example-based method for generating testing hypotheses from training data according to an embodiment of the present invention.
Figure 6A:
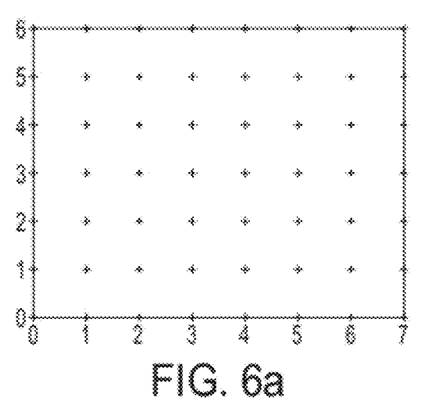
FIG. 6 illustrates example-based selection of testing hypotheses.
Figure 6B:
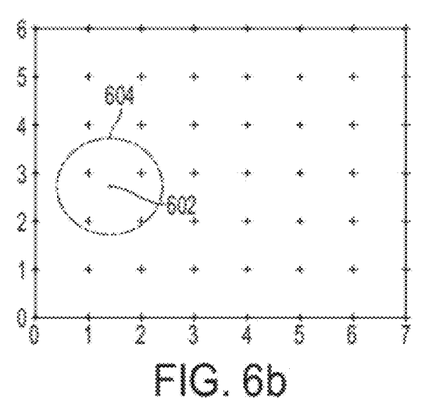
Figure 6C:
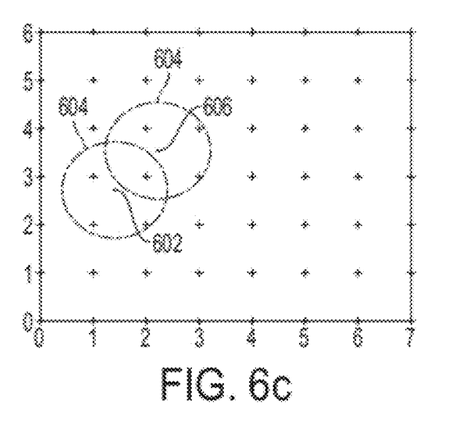

According to an embodiment of the present invention, an example-based method can be used to generate testing hypotheses from the training data. FIG. 5 illustrates an example-based method for generating testing hypotheses from training data according to an embodiment of the present invention. The example-based method of FIG. 5 can be used to implement step 108 of FIG. 1 to generate the position-orientation hypotheses. FIG. 6 illustrates example-based selection of testing hypotheses. The method of FIG. 5 is described while referring to FIGS. 5 and 6.

At step 502, the parameter space is uniformly sampled with a certain resolution r to generate a set of uniformly sampled hypotheses $S_u$. Image (a) of FIG. 6 shows a set of uniformly sampled hypotheses (shown as '+'s). At step 504, the selected set of testing hypotheses $S_t$ is cleared. At step 506, for each training sample, all of the hypotheses in $S_u$ that are within a specified distance d of the ground truth parameter in a particular training sample are added to $S_t$. Here, $d \geq r/2$, otherwise, there may be no sample in $S_u$ that satisfies this condition. In an advantageous implementation d can be set so that $d=r$. Image (b) of FIG. 6 shows step 506 applied to a first training sample. As shown in image (b) of FIG. 6, all of the uniformly sampled hypotheses within the distance 604 of the ground truth 602 of the first training sample are added to the set of testing hypotheses. Image (c) of FIG. 6 shows step 506 applied to a second training sample. As shown image (c) of FIG. 6, all of the uniformly sampled hypotheses within the distance 604 of the ground truths 602 and 606 of the first and second training samples, respectively, are added to the set of testing hypotheses. This is performed for all training samples in the training dataset, and the resulting set of testing hypotheses $S_t$ is the union of the neighboring hypotheses of the ground truths in all of the training samples. At step 508, redundant elements are removed from $S_t$ to generate the final testing hypothesis set.

The method of FIG. 5 can be used to generate a set of orientation testing hypotheses. This is described in greater detail with reference to an exemplary training dataset for detection of the left ventricle (LV) in cardiac CT volumes. In the exemplary LV detection training dataset, the method starts from a uniform set of 7416 samples distributed in the whole orientation space with α=9.72 degrees as $S_u$. On a dataset of 457 cardiac CT volumes, $S_t$ of the LV orientation has only 66 unique orientations, which is much smaller than $S_u$ (7416), and also smaller than the number of training volumes (457).

In previous MSL applications, each Euler angle is sampled uniformly under a step size β to generate hypotheses. The maximum distance for an arbitrary orientation to the closest hypothesis is $$\frac{\sqrt{3}}{2}\beta$$

using the Euclidean distance measure. As described above, embodiments of the present invention utilize the quaternion distance measure. Since different distance measures are used in previous MSL applications and embodiments of the present invention, it is difficult to compare them directly. However, for worst cases, the Euclidean distance measurement $D_e$ is as large as the quaternion distance measurement $D_q$. To achieve the nominal equivalent sampling resolution by using the Euler angle space, the search step size β should be $$\beta = \frac{2}{\sqrt{3}}\alpha,$$

that is 11.2 degrees. Suppose the range of a parameter is within $[V_{min}, V_{max}]$. We sample N points, $P_{min}, P_{min}+r, \ldots, P_{max}=P_{min}+(N-1)r$, under resolution r. In order to fully cover the whole range, $P_{min} \leq V_{min}$ and $P_{max} \geq V_{max}$, the number of sample needed would be:

$$N = \left\lceil \frac{V_{max} - V_{min}}{r} \right\rceil + 1, \quad (10)$$

where $\lceil x \rceil$ returns the smallest integer that is no less than x. On the exemplary cardiac CT dataset, sampling under resolution of 11.2 degrees, we need 5×15×6=450 samples to cover the orientation space. Using the quaternion representation and exploiting the correlation among orientation parameters, the number of hypotheses is reduced by 85% from 450 to 66 samples.

As described above, a set of orientation testing hypotheses is determined from the training data using the method of FIG. 5. In order to generate the position-orientation hypotheses (step 108 of FIG. 1) from the position candidates detected in step 106 of FIG. 1, hypotheses corresponding to each of the orientation testing hypotheses are generated for each position candidate, resulting in a set of position-orientation hypotheses. For example, if 100 position candidates are maintained from step 106, and 66 orientation samples result from the example-based method of FIG. 5, 6600 position-orientation hypotheses are generated in step 108.

Returning to FIG. 1, at step 110, position-orientation candidates are detected from the position-orientation hypotheses using a second trained classifier. In particular, the second classifier is used to scan each position-orientation hypothesis generated in step 108 to determine a probability for each hypothesis that the hypothesis is the correct position and orientation of the anatomical object. For this step, each hypothesis is tested with a scale of the mean object in the training data. The second classifier can be trained based on the annotated training data using a probabilistic boosting tree (PBT) with steerable features. In order to train the second classifier, positive and negative training samples are generated in the training data based only on position candidates in the training data that are detected as positive (i.e., high probability) by the first classifier. Once a probability is determined for each of the position-candidate hypotheses, a predetermined number (e.g., 100) of the hypotheses having the highest probabilities are maintained as position-orientation candidates.

At step 112, similarity transformation hypotheses are generated from the position-orientation candidates based on a constrained set of scale examples from the training volumes. As used herein, the term "similarity transform" refers to a full estimation of the position, orientation, and scale of the 3D anatomical object. According to an embodiment of the present invention, the example-based method of FIG. 5 for generating testing hypotheses for a parameter can be used to generate scale testing hypotheses, similar to the generation of orientation testing hypotheses. This exploits the correlation of the scale parameters and significantly reduces the search space. For example, referring to the example of the left ventricle (LV) detection in cardiac CT images described above, the LV has a roughly rotation symmetric shape. Therefore, two scales ($S_x$ and $S_y$) perpendicular to the LV long axis (represented as the z axis) are highly correlated since they are roughly the same. The ranges of the scales calculated from the 457 exemplary training volumes are [53.0, 91.1] mm for $S_x$, [49.9, 94.0] mm for $S_y$, and [72.3, 128.4] mm for $S_z$. If we uniformly sample each scale independently using a resolution of 6 mm, 8×9×11=792 samples are needed. Using the example-based method of FIG. 5, 240 samples cover the whole distribution range of the training data.

Accordingly, a set of scale testing hypotheses is determined from the training data using the method of FIG. 5. In order to generate the similarity transformation hypotheses from the position-orientation candidates detected in step 110 of FIG. 1, hypotheses corresponding to each of the scale testing hypotheses are generated for each position-orientation candidate, resulting in a set of similarity transformation hypotheses. For example, if 100 position-orientation candidates are maintained from step 110, and 240 scale samples result from the example-based method of FIG. 5, 24000 similarity transformation hypotheses are generated in step 112.

At step 114, similarity transformation candidates are detected from the similarity transformation hypotheses using a third trained classifier. In particular, the third classifier is used to scan each similarity transformation hypothesis generated in step 112 to determine a probability for each hypothesis that the hypothesis is the correct position, orientation, and scale of the anatomical object. The third classifier can be trained based on the annotated training data using a probabilistic boosting tree (PBT) with steerable features. In order to train the third classifier, positive and negative training samples are generated in the training data based only on position-orientation candidates in the training data that are detected as positive (i.e., high probability) by the second classifier.

At step 116, the 3D anatomical object is detected in the medical image volume based on the detection results of the third classifier. In one possible implementation, once a probability is determined for each of the similarity transformation hypotheses in step 114, a predetermined number (e.g., 50 or 100) of the hypotheses having the highest probabilities are aggregated to determine a final position, orientation, and scale of the 3D anatomical object in the medical image volume. In another possible implementation, the location (i.e., position, orientation, and scale) of the 3D anatomical object is detected as the similarity transformation hypothesis having the highest probability in step 114.

At step 118, the detected 3D anatomical object is output. For example, the detected 3D anatomical object can be output by displaying the detected 3D anatomical object on a display of a computer system. It is also possible that the 3D anatomical object be output by storing the detected object, for example, in memory or storage of a computer system or on a computer readable medium.

Figure 7:
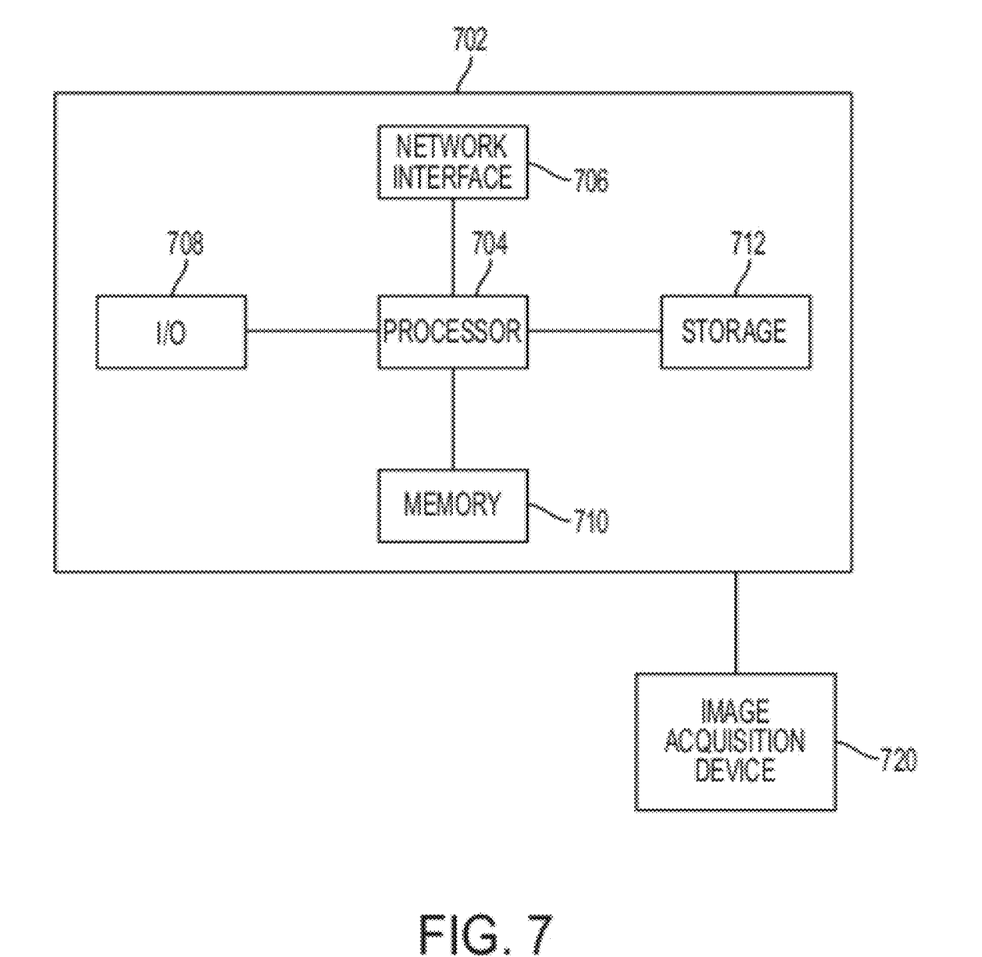
FIG. 7 is a high level block diagram of a computer capable of implementing the present invention.

The above-described methods for 3D object detection and parameter sample generation may be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the steps of the methods of FIGS. 1 and 5 may be defined by the computer program instructions stored in the memory 710 and/or storage 712 and controlled by the processor 704 executing the computer program instructions. Furthermore, the trained first, second, and third classifiers and the detection results achieved by the above described methods can be stored in the memory 710 and/or storage 712. An image acquisition device 720, such as a CT scanning device, MRI scanning device, etc., can be connected to the computer 702 to input the 3D images (volumes) to the computer 702. It is possible to implement the image acquisition device 720 and the computer 702 as one device. It is also possible that the image acquisition device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting a 3D anatomical object in a medical image volume, comprising:

determining, by a processor, a constrained search range in the medical image volume based on a set of annotated training volumes;

detecting position candidates in said constrained search range using a first trained classifier;

generating position-orientation hypotheses from said position candidates based on orientation examples in said set of training volumes;

detecting position-orientation candidates from said position-orientation hypotheses using a second classifier;

generating similarity transformation hypotheses from said position-orientation candidates based on scale examples in said set of training volumes;

detecting similarity transformation candidates from said similarity transformation hypotheses using a third trained classifier; and detecting said 3D anatomical object in the medical image volume based on at least one of said similarity transformation candidates.

2. The method of claim 1, wherein said step of determining a constrained search range in the medical image volume comprises:

for each of said training volumes, measuring six distances from an object center, each of said distances to a respective boundary of the training volume;

calculating the minimum value for each of the six distances for all of said training volumes; and determining the constrained search range in the medical image volume as a range defined by the minimum distances from each boundary of the medical image volume.

3. The method of claim 1, wherein said step of generating position-orientation hypotheses from said position candidates based on orientation examples in said set of training volumes comprises:

generating a plurality of position-orientation hypotheses from each position candidate by applying each of a plurality of orientation hypotheses generated based on examples in the training volumes to each position candidate.

4. The method of claim 3, wherein said step of generating position-orientation hypotheses from said position candidates based on orientation examples in said set of training volumes further comprises:

generating said plurality of orientation hypotheses based on examples in the training volumes by:

uniformly sampling an orientation space of the training volumes using a quaternion representation of the orientation to generate a set of uniformly sampled orientations;

generating said plurality of orientation hypotheses by, for each training volume, adding any of the uniformly sample orientations within a specified distance of a ground truth orientation in the training volume to said plurality of orientation hypotheses, wherein the distance between each uniformly sample orientation and the ground truth orientation is calculated using a quaternion distance measurement; and removing redundant elements from said plurality of orientation hypotheses.

5. The method of claim 1, wherein said step of generating similarity transformation hypotheses from said position-orientation candidates based on scale examples in said set of training volumes comprises:

generating a plurality of similarity transformation hypotheses from each position-orientation candidate by applying each of a plurality of scale hypotheses generated based on examples in the training volumes to each position-orientation candidate.

6. The method of claim 5, wherein said step of generating similarity transformation hypotheses from said position-orientation candidates based on scale examples in said set of training volumes further comprises:
generating said plurality of scale hypotheses based on examples in the training volumes by:
uniformly sampling a scale space of the training volumes to generate a set of uniformly sampled scales;
generating said plurality of scale hypotheses by, for each training volume, adding any of the uniformly sample scales within a specified distance of a ground truth scale in the training volume to said plurality of scale hypotheses; and
removing redundant elements from said plurality of scale hypotheses.

7. The method of claim 1, wherein said first, second, and third trained classifiers are trained based on the set of training volumes using a probabilistic boosting tree (PBT).

8. The method of claim 1, wherein said step of detecting said 3D anatomical object in the medical image volume based on at least one of said similarity transformation candidates comprises:
aggregating a number of said similarity transformation candidates having a highest probability to determine a position, orientation, and scale of said 3D anatomical object in said medical image volume.

9. The method of claim 1, wherein said step of detecting said 3D anatomical object in the medical image volume based on at least one of said similarity transformation candidates comprises:
detecting said 3D anatomical object as having a position, orientation, and scale of a similarity transformation candidate having a highest probability.

10. An apparatus for detecting a 3D anatomical object in a medical image volume, comprising:
means for determining a constrained search range in the medical image volume based on a set of annotated training volumes;
means for detecting position candidates in said constrained search range using a first trained classifier;
means for generating position-orientation hypotheses from said position candidates based on orientation examples in said set of training volumes;
means for detecting position-orientation candidates from said position-orientation hypotheses using a second classifier;
means for generating similarity transformation hypotheses from said position-orientation candidates based on scale examples in said set of training volumes;
means for detecting similarity transformation candidates from said similarity transformation hypotheses using a third trained classifier; and
means for detecting said 3D anatomical object in the medical image volume based on at least one of said similarity transformation candidates.

11. The apparatus of claim 10, wherein said means for determining a constrained search range in the medical image volume comprises:
means for measuring, for each of said training volumes, six distances from an object center, each of said distances to a respective boundary of the training volume;
means for calculating the minimum value for each of the six distances for all of said training volumes; and
means for determining the constrained search range in the medical image volume as a range defined by the minimum distances from each boundary of the medical image volume.

12. The apparatus of claim 10, wherein said means for generating position-orientation hypotheses from said position candidates based on orientation examples in said set of training volumes comprises:
means for generating a plurality of position-orientation hypotheses from each position candidate by applying each of a plurality of orientation hypotheses generated based on examples in the training volumes to each position candidate.

13. The apparatus of claim 12, wherein said means for generating position-orientation hypotheses from said position candidates based on orientation examples in said set of training volumes further comprises:
means for uniformly sampling an orientation space of the training volumes using a quaternion representation of the orientation to generate a set of uniformly sampled orientations;
means for generating said plurality of orientation hypotheses by, for each training volume, adding any of the uniformly sample orientations within a specified distance of a ground truth orientation in the training volume to said plurality of orientation hypotheses, wherein the distance between each uniformly sample orientation and the ground truth orientation is calculated using a quaternion distance measurement; and
means for removing redundant elements from said plurality of orientation hypotheses.

14. The apparatus of claim 10, wherein said means for generating similarity transformation hypotheses from said position-orientation candidates based on scale examples in said set of training volumes comprises:
means for generating a plurality of similarity transformation hypotheses from each position-orientation candidate by applying each of a plurality of scale hypotheses generated based on examples in the training volumes to each position-orientation candidate.

15. The apparatus of claim 14, wherein said means for generating similarity transformation hypotheses from said position-orientation candidates based on scale examples in said set of training volumes further comprises:
means for uniformly sampling a scale space of the training volumes to generate a set of uniformly sampled scales;
means for generating said plurality of scale hypotheses by, for each training volume, adding any of the uniformly sample scales within a specified distance of a ground truth scale in the training volume to said plurality of scale hypotheses; and
means for removing redundant elements from said plurality of scale hypotheses.

16. The apparatus of claim 10, wherein said first, second, and third trained classifiers are trained based on the set of training volumes using a probabilistic boosting tree (PBT).

17. The apparatus of claim 10, wherein said means for detecting said 3D anatomical object in the medical image volume based on at least one of said similarity transformation candidates comprises:
means for aggregating a number of said similarity transformation candidates having a highest probability to determine a position, orientation, and scale of said 3D anatomical object in said medical image volume.

18. The apparatus of claim 10, wherein said means for detecting said 3D anatomical object in the medical image volume based on at least one of said similarity transformation candidates comprises:

means for detecting said 3D anatomical object as having a position, orientation, and scale of a similarity transformation candidate having a highest probability.

19. A non-transitory computer readable medium encoded with computer executable instructions for detecting a 3D anatomical object in a medical image volume, the computer executable instructions defining steps comprising:

determining a constrained search range in the medical image volume based on a set of annotated training volumes;

detecting position candidates in said constrained search range using a first trained classifier;

generating position-orientation hypotheses from said position candidates based on orientation examples in said set of training volumes;

detecting position-orientation candidates from said position-orientation hypotheses using a second classifier;

generating similarity transformation hypotheses from said position-orientation candidates based on scale examples in said set of training volumes;

detecting similarity transformation candidates from said similarity transformation hypotheses using a third trained classifier; and detecting said 3D anatomical object in the medical image volume based on at least one of said similarity transformation candidates.

20. The non-transitory computer readable medium of claim 19, wherein the computer executable instructions defining the step of determining a constrained search range in the medical image volume comprise computer executable instructions defining the steps of:

for each of said training volumes, measuring six distances from an object center, each of said distances to a respective boundary of the training volume;

calculating the minimum value for each of the six distances for all of said training volumes; and determining the constrained search range in the medical image volume as a range defined by the minimum distances from each boundary of the medical image volume.

21. The non-transitory computer readable medium of claim 19, wherein the computer executable instructions defining the step of generating position-orientation hypotheses from said position candidates based on orientation examples in said set of training volumes comprise computer executable instructions defining the step of:

generating a plurality of position-orientation hypotheses from each position candidate by applying each of a plurality of orientation hypotheses generated based on examples in the training volumes to each position candidate.

22. The non-transitory computer readable medium of claim 21, wherein the computer executable instructions defining the step of generating position-orientation hypotheses from said position candidates based on orientation examples in said set of training volumes further comprise computer executable instructions defining the steps of:

generating said plurality of orientation hypotheses based on examples in the training volumes by:

uniformly sampling an orientation space of the training volumes using a quaternion representation of the orientation to generate a set of uniformly sampled orientations;

generating said plurality of orientation hypotheses by, for each training volume, adding any of the uniformly sample orientations within a specified distance of a ground truth orientation in the training volume to said plurality of orientation hypotheses, wherein the distance between each uniformly sample orientation and the ground truth orientation is calculated using a quaternion distance measurement; and removing redundant elements from said plurality of orientation hypotheses.

23. The non-transitory computer readable medium of claim 19, wherein the computer executable instructions defining the step of generating similarity transformation hypotheses from said position-orientation candidates based on scale examples in said set of training volumes comprise computer executable instructions defining the step of:

generating a plurality of similarity transformation hypotheses from each position-orientation candidate by applying each of a plurality of scale hypotheses generated based on examples in the training volumes to each position-orientation candidate.

24. The non-transitory computer readable medium of claim 23, wherein the computer executable instructions defining the step of generating similarity transformation hypotheses from said position-orientation candidates based on scale examples in said set of training volumes further comprise computer executable instructions defining the steps of:

generating said plurality of scale hypotheses based on examples in the training volumes by:

uniformly sampling a scale space of the training volumes to generate a set of uniformly sampled scales;

generating said plurality of scale hypotheses by, for each training volume, adding any of the uniformly sample scales within a specified distance of a ground truth scale in the training volume to said plurality of scale hypotheses; and removing redundant elements from said plurality of scale hypotheses.

25. The non-transitory computer readable medium of claim 19, wherein said first, second, and third trained classifiers are trained based on the set of training volumes using a probabilistic boosting tree (PBT).

26. The non-transitory computer readable medium of claim 19, wherein the computer executable instructions defining the step of detecting said 3D anatomical object in the medical image volume based on at least one of said similarity transformation candidates comprise computer executable instructions defining the step of:

aggregating a number of said similarity transformation candidates having a highest probability to determine a position, orientation, and scale of said 3D anatomical object in said medical image volume.

27. The non-transitory computer readable medium of claim 19, wherein the computer executable instructions defining the step of detecting said 3D anatomical object in the medical image volume based on at least one of said similarity transformation candidates comprise computer executable instructions defining the step of:

detecting said 3D anatomical object as having a position, orientation, and scale of a similarity transformation candidate having a highest probability.

* * * * *